United States Patent [19]

Farnam

[11] Patent Number: 4,926,952
[45] Date of Patent: May 22, 1990

[54] FOUR-WHEEL DRIVE WHEELCHAIR WITH COMPOUND WHEELS

[76] Inventor: Jeffrey Farnam, 3035 Humboldt Ave. S., Minneapolis, Minn. 55408

[21] Appl. No.: 331,596

[22] Filed: Mar. 30, 1989

Related U.S. Application Data

[63] Continuation of Ser. No. 204,509, Jun. 9, 1988, Pat. No. 4,823,900.

[51] Int. Cl.⁵ .................. A61G 5/04; B62D 11/04
[52] U.S. Cl. ................................. 180/6.5; 180/251; 180/907; 301/5 P
[58] Field of Search ............... 180/6.5, 7.1, 251, 907; 280/211, 242 WC; 301/5 R, 5 P

[56] References Cited

U.S. PATENT DOCUMENTS

| | | |
|---|---|---|
| 962,308 | 6/1910 | Burnett . |
| 1,305,535 | 6/1919 | Grabowiecki . |
| 2,436,619 | 2/1948 | Swindell .................. 280/242 WC |
| 2,551,259 | 6/1956 | Bonmartini . |
| 2,751,027 | 6/1956 | McLaughlin . |
| 2,765,860 | 10/1956 | Church . |
| 2,798,565 | 7/1957 | Rosenthal .............. 280/242 WC X |
| 3,037,570 | 6/1962 | Olson ................................. 180/6.5 |
| 3,253,632 | 5/1966 | Dalrymple ..................... 301/5 P X |
| 3,746,112 | 7/1973 | Ilon ................................ 301/5 P X |
| 3,789,947 | 2/1974 | Blumrich . |
| 3,848,883 | 11/1974 | Breacain . |
| 3,945,449 | 3/1976 | Ostrow .................. 280/242 WC X |
| 4,077,483 | 3/1978 | Randolph . |
| 4,119,163 | 10/1978 | Ball .................................... 180/6.5 |
| 4,199,036 | 4/1980 | Wereb ................................ 180/6.5 |
| 4,223,753 | 9/1980 | Bradbury . |
| 4,237,990 | 12/1980 | La . |
| 4,258,815 | 3/1981 | Wier . |
| 4,335,899 | 6/1982 | Hiscock . |
| 4,339,013 | 7/1982 | Weigt ..................... 280/242 WC X |
| 4,375,295 | 3/1983 | Volin . |

FOREIGN PATENT DOCUMENTS

| | | |
|---|---|---|
| 300247 | 8/1917 | Fed. Rep. of Germany . |
| 77342 | of 1977 | Japan . |
| 50830 | of 1980 | Japan . |

OTHER PUBLICATIONS

Gordon Stout; Some Aspects of High Performance Indoor/Outdoor Wheelchairs, Bulletin of Prosthetics Research; pp. 135–175; Fall 1979.
M. W. Thring, Mechanical Aids for the Disabled, vol. 2, No. 2, Apr. 1973, 32–40.
Accent on Living, Winter 1979, pp. 54–57.

Primary Examiner—Robert G. Nilson
Attorney, Agent, or Firm—Merchant, Gould, Smith, Edell, Welter & Schmidt

[57] ABSTRACT

A four-wheel drive wheelchair is disclosed, the wheelchair includes a frame and seat for supporting a user in an upright position and a pair of rear wheels mounted on opposite sides of the frame for supporting the rear end thereof. Front compound-wheels are mounted on opposite sides of the frame for supporting the front end thereof with each of the wheels capable of rotating in a plane parallel to the side of the frame in a conventional manner and including castor wheels mounted around the perimeter thereof to permit the front end of the wheelchair to roll substantially freely from side to side in addition to forward and backward. Drive for the wheels is provided by sprocket and chain, with the front and rear wheels on each side interconnected to turn in unison and driven by differential control whereby the wheelchair may be steered differentially, by joystick control.

5 Claims, 2 Drawing Sheets

FOUR-WHEEL DRIVE WHEELCHAIR WITH COMPOUND WHEELS

This is a continuation of application Ser. No. 204,509, filed on June 9, 1988, now U.S. Pat. No. 4,823,900.

TECHNICAL FIELD OF THE INVENTION

The present invention generally pertains to wheelchairs for the disabled and more particularly to a self-propelled four-wheel drive wheelchair for use by quadriplegic individuals.

BACKGROUND OF THE INVENTION

Practical self-propelled wheelchairs were first made possible in the 1950's and 1960's, as practical and relatively inexpensive rechargeable battery technology became available. Since their introduction, numerous designs have been proposed to improve traction and maneuverability of the two-wheel drive self-propelled wheelchair, many of which involve elaborate "endless belt" drive systems, as for example shown in U.S. Pat. No. 2,765,860 to Church, issued Oct. 9, 1956; U.S. Pat. No. 2,751,027 to McLaughlin, issued June 19, 1956; U.S. Pat. No. 4,077,483 to Randolph, issued Mar. 7, 1978; and U.S. Pat. No. 4,119,163 to Ball, issued Oct. 10, 1978. While each of the wheelchairs disclosed in those patents are relatively mobile and capable of negotiating obstacles, they are all characterized by elaborate designs implementing many components to carry the endless belts and provide the driving force thereto, and thus are relatively heavy or have a high degree of rolling friction. Thus, inordinate quantities of electrical energy are required to drive these chairs resulting in relatively limited range between battery recharge. In addition, they are difficult to transport, require relatively high levels of maintenance, and can be destructive of certain flooring materials, such as carpet, due to differential steering.

Thus, four-wheel drive endless belt wheelchairs not been well accepted. For similar reasons, wheeled-only four-wheel drive wheelchairs have also met with little success, as they too necessitate differential steering, for example as employed in a "bobcat" front-end loader, which like in the case of endless belt systems can impose an inordinate drain on the wheelchair batteries, and can be destructive of floor coverings. However, the maneuverability afforded by either endless belt or four-wheel drive does have advantages worth pursuing. For instance, four-wheel drive greatly enhances the climbing ability of the wheelchair, for example, to transverse small or low obstacles, and improves traction significantly on slippery or disintegrated surfaces, and relatedly improves braking ability, especially when proceeding down an incline.

SUMMARY OF THE INVENTION

The present invention provides a self-propelled four-wheel drive wheelchair of a relatively uncomplicated and lightweight design which overcomes the above-described problems with prior art four-wheel drive or endless belt wheelchairs. The wheelchair of the present invention provides a frame for supporting a seat and includes four wheels, two mounted on each side of the frame, front and back, for free rotation, to support the frame over the ground. The rear wheels are each comprised of a hub and tire means mounted therearound, while each of the front wheels are compound, comprising a hub with a plurality of smaller diameter wheels supported around the perimeter of the hub, with the axes of said smaller diameter wheels disposed parallel to the plane of rotation of said hub, so that said front wheels may roll substantially freely in a conventional manner, and in addition, laterally of the wheelchair. A pair of drive means are provided, one on each side of the wheelchair, with each drive means interconnecting the front and rear wheels on a side to turn in unison. The drive means are mounted to the frame below the seat on the opposite sides of the frame, and a power source for energizing said drive means is provided and also mounted to the frame below the seat. Control means are provided to permit the user seated in the wheelchair to control each of said drive means independently, so that the wheels on a side may be rotated either forward or backward, to permit said wheelchair to be steered by differential rotation of said wheels.

Thus, the present invention provides a wheelchair which includes the benefits of four-wheel drive but which enables the front end of the wheelchair to pivot or move laterally from side-to-side with little frictional resistance by the front wheels. In this manner, the wheelchair may be turned by application of far less power than in the case of an endless belt drive system or even a conventional four-wheel drive wheelchair with differential steering, and potential damage to the floor is also substantially avoided. These and other features of the invention are set forth in the ensuing specification and drawing.

DETAILED DESCRIPTION OF THE INVENTION

Figure 1:
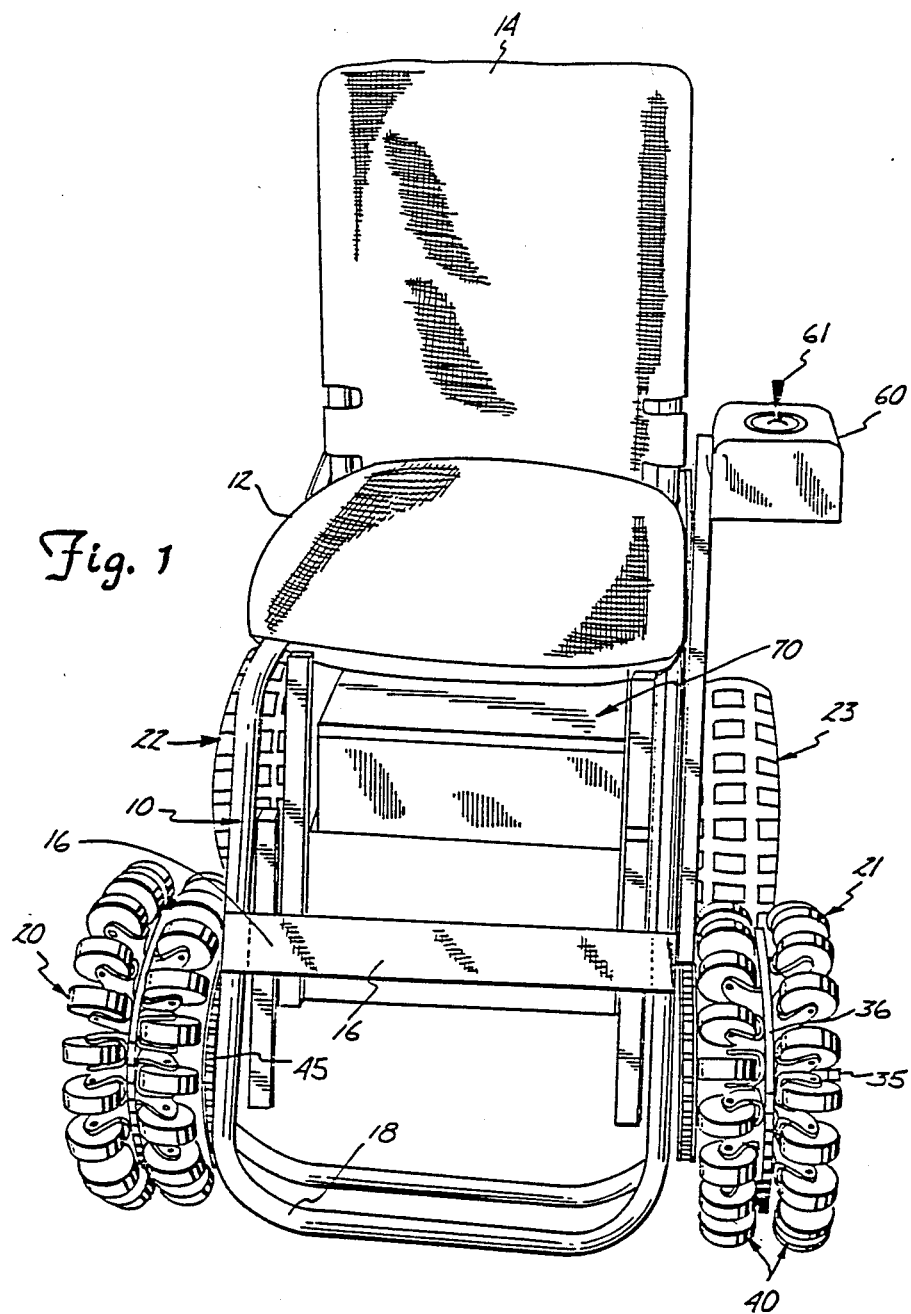
FIG. 1 is a front perspective view of the wheel chair according to the present invention.
Figure 2:
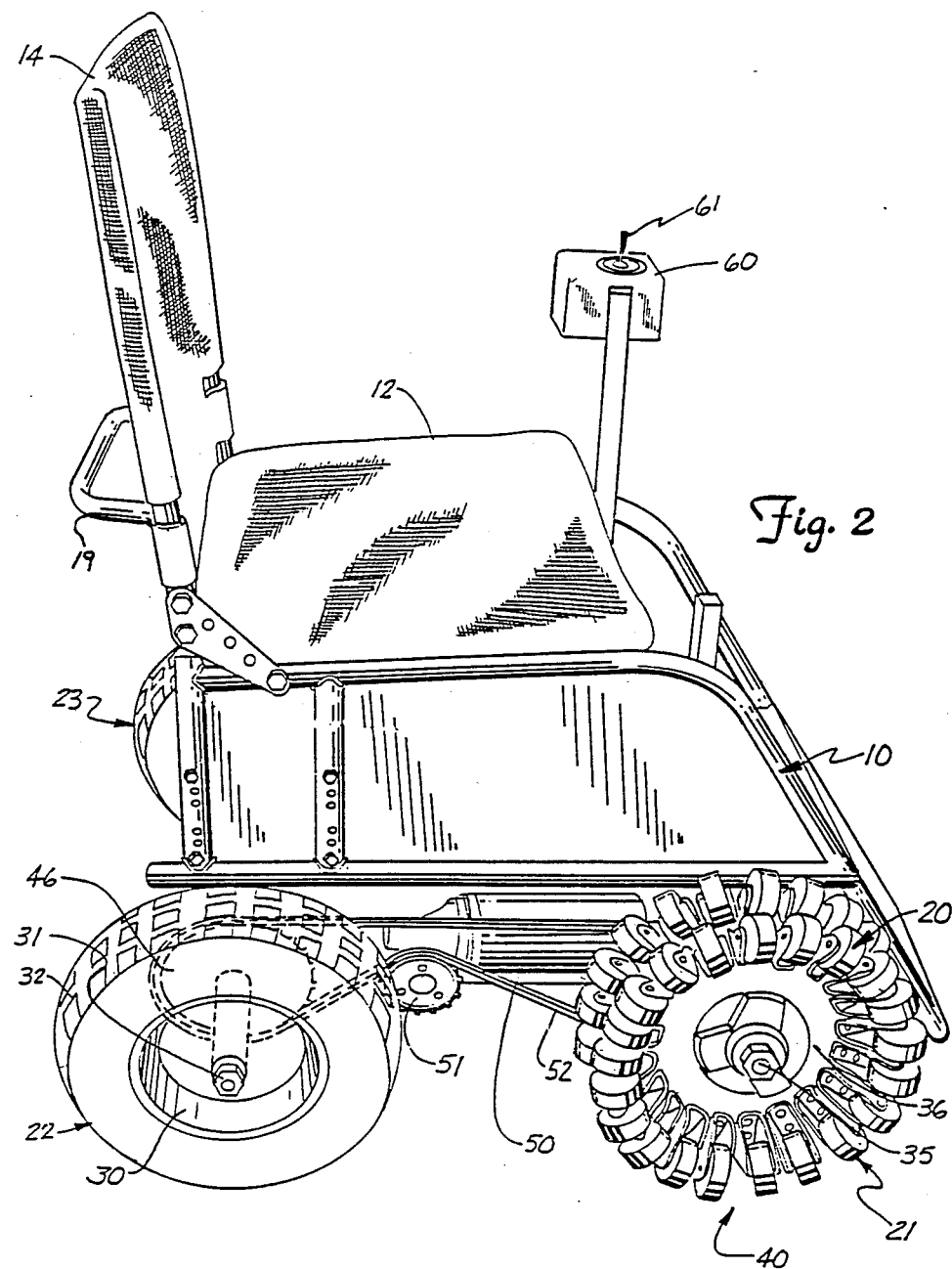
FIG. 2 is a side perspective view of the wheel chair according to the present invention.

Referring to FIGS. 1 and 2, there is shown a front and side perspective view of the wheelchair according to the present invention. A frame generally designated 10, is provided to support a seat 12 and backrest 14, to support the user in an upright sitting position in the wheelchair. A leg support member 16 and footrest 18 are provided to support the user's legs and feet respectively. A push or pull bar 19 is provided to be used in conventional manner.

Frame 10 is supported over the ground for rolling movement by wheel assemblies 20–23. Each of rear wheel assemblies 22 and 23 are conventional in nature, and generally include, as shown with respect to wheel assembly 22, a hub member 30 which is mounted about a fixed axle 31 for free rotation with a ball-bearing assembly (not shown). An inflatable tire 32 is provided and mounted on hub 30, although it will be understood that a non-inflatable tire would also suffice.

As shown with respect to front wheel assembly 21 in FIG. 1 and front wheel assembly 20 in FIG. 2, each of these also include a hub member 36 mounted on a fixed axle 35 for free rotation by a ball-bearing assembly (not shown). Around the perimeter of hub 36 there is provided a plurality of smaller diameter "perimeter" wheels or rollers 40. Wheels 40 are mounted around the perimeter of hub 36 on opposite sides thereof, with the wheels on one side being staggered or offset by roughly one wheel's width along the arc of hub 36, in order to provide a substantially continuous bearing surface along the ground as the wheel rotates about axle 35. Each of wheels 40 are free to rotate about their respective axles in either direction parallel to axle 35. Thus, it may be readily appreciated that the front end of the wheelchair may be substantially freely pivoted or moved laterally from side-to-side, while at the same time, "compound" wheels 20 and 21 permit the wheelchair to be moved forward and backward in conventional manner.

Each of the hubs of wheel assemblies 20–23 has a sprocket member mounted thereto, as shown with respect to assemblies 20 and 22, which include sprockets 45 and 46 respectively, as seen in FIG. 2. A conventional motor drive assembly 50 is provided and is mounted generally to the frame 10, and includes an output drive sprocket 51. Motor drive assembly 50 may be controlled via controls 60 which includes a joystick-type control 61, which may be moved in a conventional manner to cause sprocket 51 to rotate clockwise or counterclockwise by application of drive energy from assembly 50. A chain 52 is provided and is wrapped about sprockets 45 and 46 and up and over the top of sprocket 51, whereby drive power is transferred from sprocket 51 to wheels 20 and 22. Although not shown for the sake of clarity and brevity in the drawing, a functionally identical drive and sprocket assembly is provided and mounted on the other side of the frame 10 for movement of wheels 21 and 23, as controlled by controls 60. Further conventional control circuits cooperating with controls 60 to control the application of battery power to the drive motors, and rechargeable batteries 70 are mounted beneath seat 12 to the frame 10.

Thus, each of wheel assemblies 20 and 22, and 21 and 23 are rotated in unison by the respective drive assemblies, under the control of joystick 61, which provides that either pair be independently rotated clockwise or counterclockwise, (i.e., forward or backward), such that the wheelchair may be steered by differential application of drive power, in a manner conventional to two-wheel drive self-propelled wheelchairs. However, by virtue of the added degree of rolling movement of the front wheels 20 and 21, the wheelchair may be made to turn right and left using substantially less power than is required in the case where the front wheels are of a conventional design. Thus, four-wheel drive power may be provided without sacrificing the range necessary to make the wheelchair practical and usable. Furthermore, and perhaps more importantly, the wheelchair of the present invention turns substantially freely and smoothly from side to side by rolling on the perimeter wheels, permitting the wheelchair to be used indoors without marring or damaging floor coverings.

While the front wheels 20 and 21 have been shown as constructed with fixedly mounted castor-like wheels, it is contemplated that many other designs which provide for the additional freedom of lateral movement of the front end of the wheelchair are possible, and it should be understood that the invention is in no way limited to the particular embodiment of wheels 20 and 21 shown in the drawing. Furthermore, it is contemplated, although not believed to be preferred, that the multidirectional wheels be utilized on the rear of the chair with conventional wheels in front. Moreover, as may be readily evident, the four-wheel drive system of the present invention may be practiced outside of the wheelchair art in the vehicular art in general.

While the present invention has been described herein in its preferred form, it is in no way limited thereto, as various changes or modification to the disclosed embodiment may be made without departing from the spirit and scope of the invention, as is defined in the claims appended hereto.

What is claimed is:

1. A four-wheel drive vehicle comprising:

a frame;

a pair of non-compound rear wheels mounted near the rear end and on opposite sides of said frame for supporting the rear end thereof, each of said rear wheels mounted for rotation in a fixed plane parallel to the side of said frame;

a pair of front compound wheels mounted near the front end and on opposite sides of said frame for supporting the front end thereof, each of said wheels mounted for rotation in a fixed plane parallel to the side of said frame and providing a substantially continuous traction-providing surface with respect to wheel rotation in said plane and supporting the front end of said vehicle to roll substantially freely transverse to said plane from side to side, the tread of each of said rear wheels providing flotation for each of said rear wheels on outdoor terrain and further wherein the tread of each of said front compound wheels provides flotation which is substantially equal to the flotation of said treads on said front wheels, whereby said front and rear wheels provides substantially the same flotation for said vehicle on outdoor terrain;

differential steering means including first means for connecting the front and rear wheels on one side of said frame to turn in unison, second means for connecting the front and rear wheels on the other side of said frame to turn in unison and motorized drive means including one or more electrical motors and control circuits for applying forward or rearward drive power to each set of connected wheels so that said vehicle may be steered differentially, said motorized drive means further including rechargeable batteries for supplying drive power thereto;

whereby the front wheels play an active role in the driving, steering and braking of the vehicle, so that powered four-wheel drive and four-wheel differential steering is provided, said front compound wheels permitting the vehicle to be turned with substantially less power than that which is required to turn a skid steer four-wheel drive vehicle.

2. A vehicle comprising:

a frame;

a pair of rear wheels, said rear wheels being fixed to rotate relative to a rear portion of said frame in first and second parallel planes;

a pair of front wheels, said front wheels being fixed to rotate relative to a front portion of said frame in third and fourth parallel planes which are substantially parallel to the first and second planes; and a plurality of compound wheel members mounted for rotation in at least two rows about a peripheral edge of each of said front wheels, with a space defined between said rows, said compound wheel members being oriented so as to allow rolling movement of said respective front wheel in a direction which is substantially transverse to the planes, whereby the vehicle may be steered with a minimum of resistance, and whereby a smooth support surface is provided for engaging an underlying support surface.

3. A four-wheel drive vehicle comprising:

a frame;

a pair of non-compound rear wheels mounted near the rear end and on opposite sides of said frame for supporting the rear end thereof, each of said rear wheels mounted for rotation in a fixed plane parallel to the side of said frame;

a pair of front compound wheels mounted near the front end and on opposite sides of said frame for supporting the front end thereof, each of said wheels mounted for rotation in a fixed plane parallel to the side of said frame and providing a substantially continuous traction providing surface with respect to wheel rotation in said plane and supporting the front end of said vehicle to roll substantially freely transverse to said plane to side to side, the tread of each of said rear wheels providing flotation for each of said rear wheels on outdoor terrain and further wherein the tread of each of said front compound wheels provide flotation which is substantially equal to the flotation of said treads on said rear wheels, whereby said front and rear wheels provide substantially the same flotation for said vehicle on outdoor terrain;

differential steering means, including first means for connecting the front and rear wheels on one side of said frame to turn in unison, second means for connecting the front and rear wheels on the other side of said frame to turn in unison and motorized drive means including one or more motors and controls for applying forward or rearward drive power to each set of connected wheels so that said vehicle may be steered differentially;

whereby the front wheels play an active role in the driving, steering and braking of the vehicle, so that powered, four-wheel drive and four-wheel differential steering is provided, said front compound wheels permitting the vehicle to be turned with substantially less power than that which is required to turn a skid steer, four-wheel drive vehicle.

4. A vehicle comprising:

a frame;

a pair of rear wheels, said rear wheels being fixed to rotate relative to a rear portion of said frame in first and second parallel planes;

a pair of front wheels, said front wheels being fixed to rotate relative to a front portion of said frame in third and fourth parallel planes which are substantially parallel to the first and second planes; and a plurality of compound wheel members mounted for rotation about a peripheral edge of each of said front wheels and oriented so as to allow rolling movement of said respective front wheel in a direction which is substantially transverse to the planes, whereby the vehicle may be steered with a minimum of resistance, wherein the tread of each of said rear wheels provides flotation for each of said rear wheels on outdoor terrain and further wherein the tread of each of said front compound wheels provides flotation which is substantially equal to the flotation of said treads on said rear wheels, whereby said front and rear wheels provide substantially the same flotation for said vehicle on outdoor terrain.

5. A four-wheel drive vehicle comprising:

a frame;

a pair of non-compound first end wheels mounted near a first end and on opposite sides of said frame for supporting the first end thereof, each of said first end wheels mounted for rotation in a fixed plane relative to the side of said frame;

a pair of second end compound wheels mounted near the second end and on opposite sides of said frame for supporting the second end thereof, each of said wheels mounted for rotation and a fixed plane relative to the edge of said frame and providing a substantially continuous traction providing surface with respect to wheel rotation in said plane and supporting the second end of said vehicle to roll substantially freely transverse to said plane from side to side, the tread of each of said first end wheels providing flotation for each of said second end wheels on outdoor terrain and further wherein the tread of each of said second end compound wheels provides flotation which is substantially equal to the flotation of said treads on said first end wheels, whereby said second end and first end wheels provides substantially the same flotation for said vehicle on outdoor terrain;

differential steering means including first means for connecting the second end and first end wheels on one side of said frame to turn in unison, second means for connecting the second end and first end wheels on the other side of said frame to turn in unison and motorized drive means including one or more motors and controls for applying forward or rearward drive power to each set of connected wheels so that said vehicle may be steered differentially;

whereby the second end wheels play an active role in the driving, steering and braking of the vehicle, so that powered, four-wheel drive and four-wheel differential steering is provided, said second end compound wheels permitting the vehicle to be turned with substantially less power than that which is required to turn a skid steer, four-wheel drive vehicle.

* * * * *

UNITED STATES PATENT AND TRADEMARK OFFICE
CERTIFICATE OF CORRECTION

PATENT NO. : 4,926,952

DATED : May 22, 1990

INVENTOR(S) : Jeffrey Farnam

It is certified that error appears in the above-identified patent and that said Letters Patent is hereby corrected as shown below:

Title page, item (63)

insert --, which is a continuation of Ser. No. 928,620, filed November 4, 1986 now abandoned, which is a continuation of Ser. No. 783,325, filed October 2, 1985 now abandoned, which in turn is a continuation of Ser. No. 605,858, filed May 1, 1984 now abandoned.-- at end of line.

COLUMN 1, LINE 6 insert --, which is a continuation of Ser. No. 928,620, filed November 4, 1986 now abandoned, which is a continuation of Ser. No. 783,325, filed October 2, 1985 now abandoned, which in turn is a continuation of Ser. No. 605,858, filed May 1, 1984 now abandoned.-- at end of line.

COLUMN 1, LINE 40 insert --have-- before "not".

Signed and Sealed this

Fourteenth Day of January, 1992

Attest:

HARRY F. MANBECK, JR.

*Attesting Officer*  *Commissioner of Patents and Trademarks*